United States Patent [19]

Piper

[11] 4,289,434

[45] Sep. 15, 1981

[54] PORTABLE KEY SEAT CUTTER FOR SHAFTS

[75] Inventor: Bert W. Piper, 36051 Goddard Rd., Romulus, Mich. 48174

[73] Assignee: Bert William Piper, Belleville, Mich.

[21] Appl. No.: 78,500

[22] Filed: Sep. 24, 1979

[51] Int. Cl.³ .............................................. B23C 3/30
[52] U.S. Cl. ................................ 409/177; 51/241 S; 144/136 H
[58] Field of Search ............. 409/177, 184; 51/241 S; 144/136 C, 136 H

[56] References Cited

U.S. PATENT DOCUMENTS

| 280,252 | 7/1883 | Cosgrove | 409/177 |
| 2,373,341 | 4/1945 | Rowe | 409/177 |
| 2,602,375 | 7/1952 | Holt | 409/177 |

*Primary Examiner*—Z. R. Bilinsky
*Attorney, Agent, or Firm*—Barnes, Kisselle, Raisch & Choate

[57] ABSTRACT

The key seat cutter consists of a portable frame adapted to be clamped on a shaft and having a cutter and a cutter drive mechanism mounted on a slide reciprocable on the frame by a manually rotatable lead screw. The input to the drive mechanism consists of a stub shaft adapted to be connected with the chuck of an electrical hand drill.

5 Claims, 6 Drawing Figures

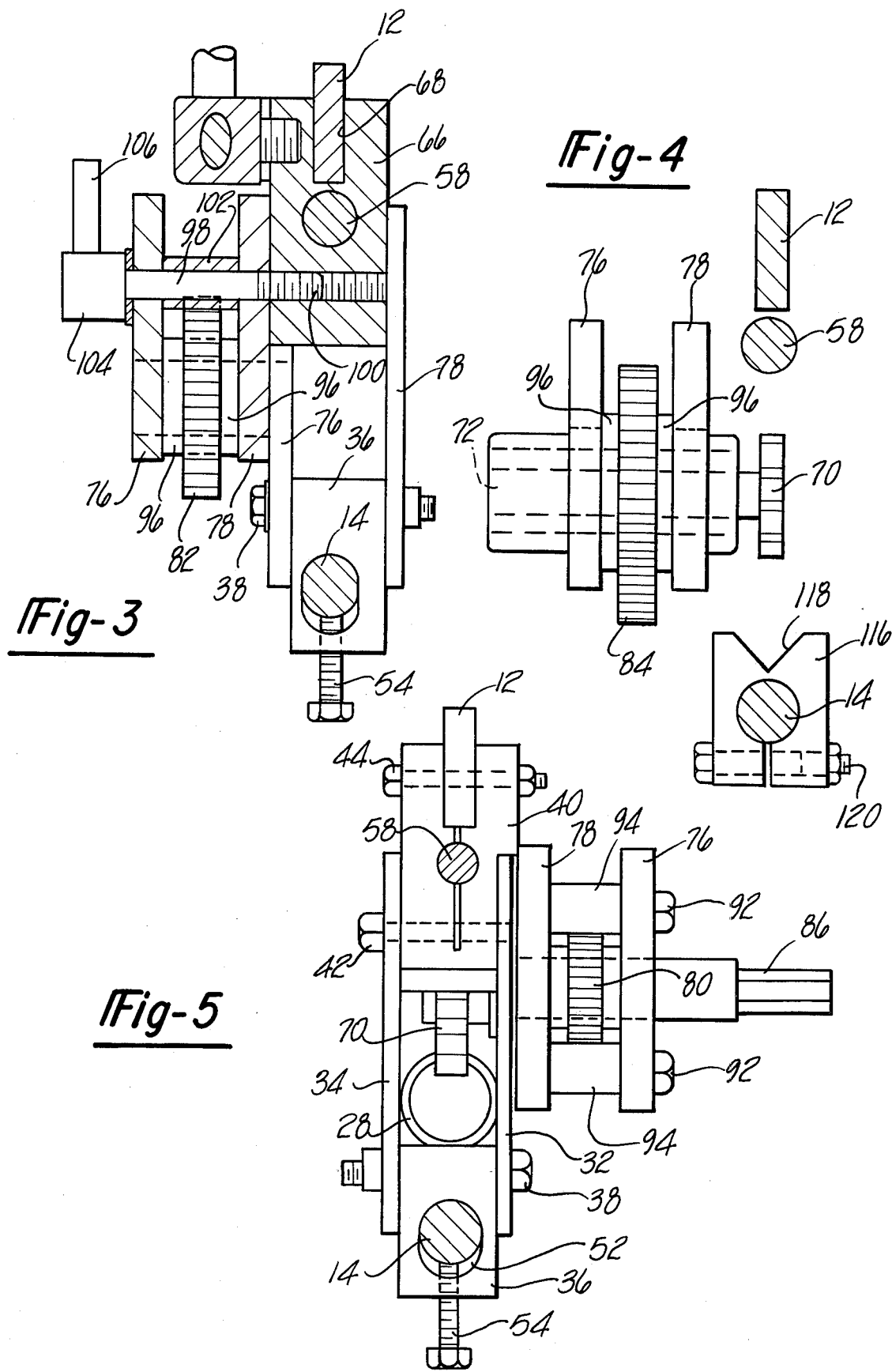

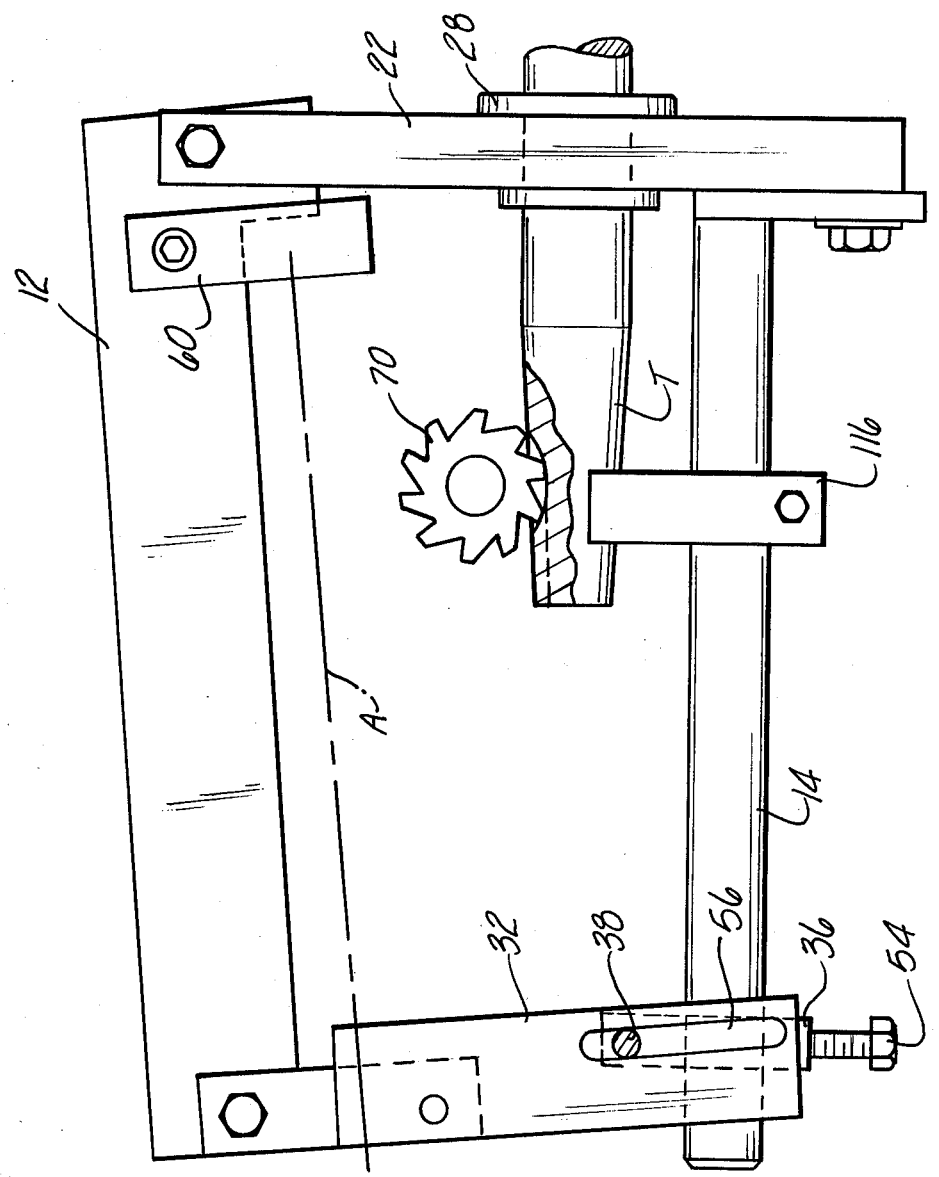

PORTABLE KEY SEAT CUTTER FOR SHAFTS

This invention relates to a portable key seat cutter for shafts.

In small repair and machine shops the need frequently arises to form a key seat in a shaft. Normally the cutting of key seats in shafts requires mounting the shaft on a milling machine or similar machine tool. This requirement poses at least two problems. Many small repair and machine shops do not have milling machines or similar tools for cutting such key seats. In addition, in order to cut such key seats in the conventional manner the shaft must be removed from its associated mechanism and mounted on the machine tool adapted to cut the key seat.

The primary object of this invention is to avoid the problems referred to by providing a relatively small key seat cutter that is readily portable and adapted to be mounted directly on the shaft in which the key seat is to be cut.

A further object of the invention is to provide a key seat cutter for shafts adapted to be powered by a conventional hand held drill.

More specifically, the invention comprises a frame constructed so that it can be rigidly mounted on a shaft, even between the journalled sections of a shaft, to enable cutting a key seat along any section of the shaft without requiring removal of the shaft from the machine or mechanism in which it is assembled. The rotary key seat cutting tool and a drive train for the tool are mounted on a carriage supported on a slide guided for rectilinear movement on the frame in alignment with the axis of the shaft on which the frame is mounted. The slide is moved by a manually rotatable lead screw to cut the key seat to the desired length and the carriage is pivotally adjustable on the slide to obtain the desired depth of the cut.

Other objects, features and advantages of the present invention will become apparent from the following description and accompanying drawings, in which:

FIG. 3 is a sectional view along the line 3—3 in FIG. 2;

FIG. 4 is a sectional view along the line 4—4 in FIG. 2;

FIG. 5 is a sectional view along the line 5—5 in FIG. 2;

FIG. 6 is a side elevational view of the cutter with portions removed and showing it arranged for cutting a key seat in a tapered shaft.

Figure 1:
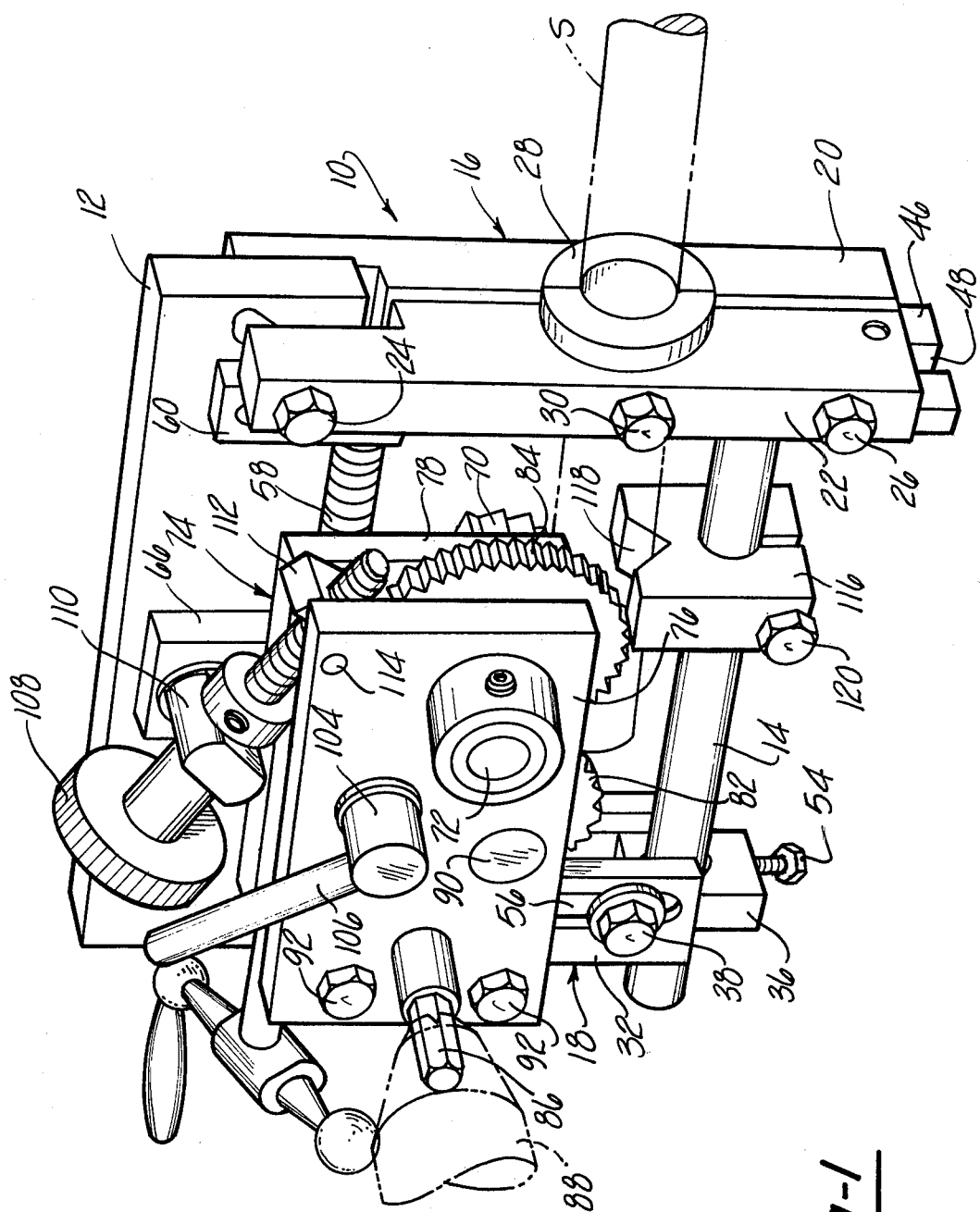
FIG. 1 is a perspective view of a key seat cutter according to the present invention.

The key seat cutter of the present invention generally comprises a main frame 10 which consists of a top guide bar 12 and a lower support bar 14. The opposite ends of guide bar 12 and support bar 14 are interconnected by upright end bars 16,18 to form a generally rectangular frame. Front end bar 16 comprises a pair of upright brackets 20,22 the upper ends of which are clamped to one end of guide bar 12 by a screw 24 extending through an elongated inclined opening 25 in the guide bar. The lower ends of brackets 20,22 are clamped together by a screw 26. A split bushing 28 extends through brackets 20,22 and is secured in place by a lock screw 30.

Rear end bar 18 comprises a pair of side plates 32,34 (FIG. 5) having their lower ends clamped to the opposite face of spacer block 36 by a screw 38. The upper ends of side plates 32,34 are clamped to the opposite sides of an upper spacer block 40 by a screw 42. Guide bar 12 is clamped within an upwardly open slot in spacer bar 40 by means of a screw 44.

At the forward end thereof support bar 14 is fixedly secured to saddle plate 46 which is vertically slotted as at 48 (FIG. 1) for vertical adjustment on bracket 22. It is secured to bracket 22 in its vertically adjusted position by a screw 50. The rear end of support bar 14 extends through a vertically elongated opening 52 in the lower spacer block 36 and is clamped therein by a screw 54. Spacer block 36 is in turn vertically adjustable between side plates 32,34 by reason of vertical slots 56 in the two side plates through which screw 38 extends.

A lead screw 58 is journalled at its front end on a support block 60 mounted on guide bar 12 adjacent bracket 22 by a screw 62. The rear end of lead screw 58 is journalled in and extends through the upper block 40 and has a handle 64 thereon to enable manual rotation of the screw.

A slide 66 is threaded on lead screw 58 and has an upward opening slot 68 at the upper end thereof which engages the opposite faces of guide bar 12 so that as screw 58 is rotated in opposite directions, slide 66 is caused to travel along the length of guide bar 12.

The rotary cutting tool for cutting the key seat in a shaft is designated 70 and is journalled on a carriage 74. The carriage 74 comprises a pair of space plates 76,78 between which are journalled meshing gears 80,82,84 which form a drive train for cutter 70. Gear 80 is journalled on a stub shaft 86 projecting outwardly through plate 76 and to which the chuck 88 of a conventional hand held drill may be secured. Gear 84 is keyed to shank 72 of cutter 70 and gear 82 is an intermediate gear journalled on a shaft 90. Adjacent one end plates 76,78 are clamped together in spaced relation by screws 92 which extend through bushings 94 for maintaining the plates in their properly spaced relation (FIG. 5). Adjacent their opposite end the two plates are spaced apart by bearings 96 on opposite sides of gear 82.

At generally the central portion thereof the carriage 74 is pivotally supported on slide 66 by means of a screw 98 which extends through both plates 76,78 and is threaded into slide 66 as at 100. Screw 98 extends through a spacer bushing 102 interposed between plates 76,78. At its outer end screw 98 is formed with an enlarged head 104 bearing against the outer plate 76 and having a handle 106 thereon for enabling clamping the carriage 74 in a desired pivotally adjusted position on slide 66.

The means for pivotally adjusting carriage 74 on slide 66 comprises a thumb screw 108 journalled in a block 110 which is pivotally mounted on slide 66. Screw 108 is threaded into a nut 112 which is pivotally supported between plates 76,78 as at 114. It will be appreciated that carriage 74 is rocked about the axis of screw 98 in response to rotation of screw 108.

In operation the main frame 10 is mounted on the shaft S in which the key seat is to be cut by telescoping the frame over the end of the shaft so that the shaft is encircled by the split bushing 28. It will be understood, of course, that a bushing 28 of the proper size is utilized so as to have a close fit with the shaft. In the event that it is desired to form a key seat in a shaft at a section thereof intermediate two spaced journalls on the shaft, in order to mount the main frame on the shaft it is essential to separate the two brackets 20,22 by removing screws 24,26 and to remove spacer block 36 from between side plates 32, 34. After the frame is arranged over the shaft the two brackets 20,22 can then be again clamped together and the spacer block 36 again arranged between the side plates 32,34. A support block 116 having V-shaped notch 118 at its upper end is slidably mounted on support bar 14 and is adapted to be clamped into position by a screw 120. The V-shaped groove 118 is located and dimensioned so as to engage the outer surface of the shaft extending through bushing 28 at the section thereof generally directly below the portion in which the key seat slot is to be cut. The maintaining of support bar 14 at its opposite ends enables it to be raised and lowered so that support block 116 can accomodate shafts of different sizes.

Figure 2:
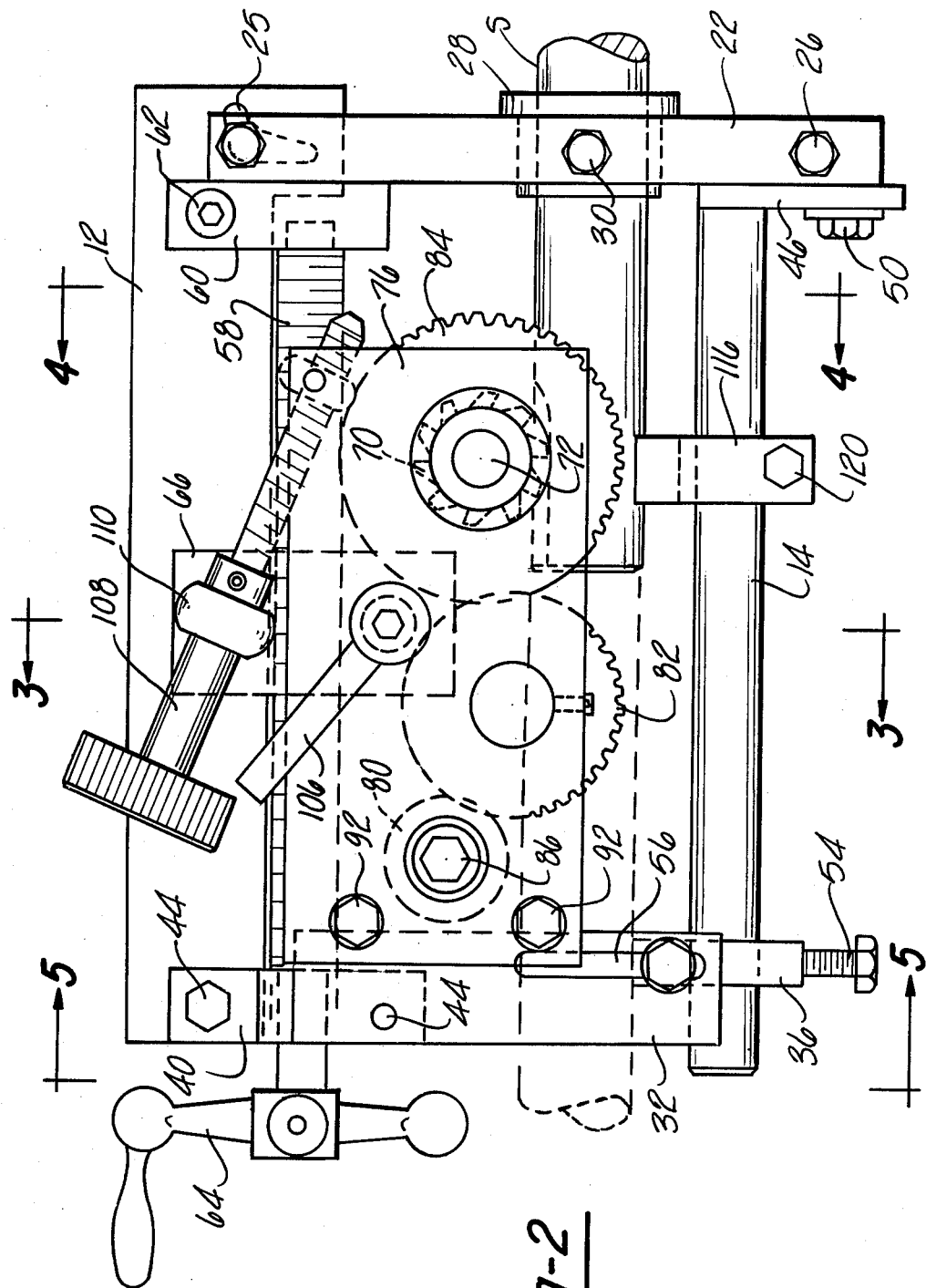
FIG. 2 is a side elevational view thereof.

After the frame 10 is rigidly mounted on the shaft at the section thereof in which the key seat is to be cut, lead screw 58 is rotated to advance the cutter 70 toward end bar 16 to one end of the key seat to be cut. The drill motor connected to stub shaft 86 is then energized to rotate the cutter in a clockwise direction as viewed in FIGS. 1 and 2. With the clamping screw 98 loosened thumb screw 108 is turned to feed cutter 70 downwardly into the shaft to the desired depth of cut. Thereafter clamping screw 98 is tightened to hold the cutter at the desired depth. Lead screw 58 is then rotated slowly and thus cause slide 56 and cutter 70 to retract in a rectilinear path toward end bar 18 and thereby cut the key seat to the desired length.

In the event it is desired to cut a key seat in tapered portion T of a shaft such as shown in FIG. 6 the procedure is substantially the same as described. However, after the screws which maintain the frame rigid are loosened, lower spacer block 36 between side plates 32,34 is shifted upwardly and locked in place by screw 38 in a position such that the axis A of lead screw 58 is parallel to the tapered inclination on the shaft. The remaining screws are then tightened and the key seat is then cut as described above.

Although the key seat cutter of the present invention is a relatively small lightweight assembly it will be appreciated that when mounted on a shaft as described it becomes a relatively rigid unit capable of cutting a key seat in an accurate manner. It will be noted, for example, that guide bar 12, lead screw 58, cutter 70 and support bar 14 are vertically aligned in the same plane. This is apparent from the showing in FIGS. 4 and 5. Thus, when the frame 10 is clamped to a shaft and the cutter 70 is rotated and fed longitudinally to cut the key seat the forces on the frame are equalized and do not tend to produce torque which would render the unit unstable.

I claim:

1. A portable tool for cutting a longitudinally extending key seat in a work shaft comprising, a generally rectangularly shaped, main support frame having spaced front and rear upright end bars, a lower support bar extending between and connecting the lower ends of the end bars and an upper guide bar extending between and connecting the upper ends of the end bars, said guide bar forming a rectilinear guideway between said end bars, said front end bar having an opening therein above the support bar through which the free end portion of a work shaft is adapted to be extended, means for clamping said work shaft in said opening, an upright support block mounted on said support bar and adjustable lengthwise thereof, said support block being adapted to engage and support a portion of the work shaft extending through said opening and cooperating with said front end bar for rigidly mounting the frame in a fixed position on a work shaft such that the guideway extends lengthwise of and above the shaft on which the frame is clamped, a slide mounted for rectilinear movement on said guideway, a manually rotatable lead screw extending between said end bars and parallel to said guideway, said lead screw being connected with said slide to shift the slide lengthwise of the guideway when the screw is rotated, a carriage supported on said slide for movement therewith and pivotable thereon about a horizontal axis perpendicular to the path of travel of the slide toward and away from the shaft on which the frame is mounted, means for pivoting the carriage in a vertical plane about said axis on the slide, a drive train on said carriage having an input shaft, a horizontally extending output shaft and gears interconnecting said shafts, said input shaft comprising a stub shaft adapted to be connected with the chuck of a hand-held, power driven drill, said output shaft being journalled on said carriage adjacent the front end thereof and having a rotary key seat cutter mounted thereon for rotation in the axial plane of the work shaft on which the frame is mounted, said output shaft being spaced radially from and forwardly of the pivot axis of the carriage on the slide so that the key seat cutter is displaced in a vertical plane toward and away from the axis of the work shaft in response to pivotal movement of the carriage, said drive train being driven by said input shaft and being free of a driving connection with the lead screw so that rotation of the cutter is independent of its adjustment lengthwise of the shaft, whereby, when the input shaft is connected to the rotating chuck of a hand-held drill, the cutter can be fed radially into the work shaft to cut an arcuate slot therein and can then be advanced lengthwise of the frame by rotating said lead screw to cut a key slot lengthwise of the shaft to the free end thereof.

2. A tool as called for in claim 1 wherein the lower portion of the rear end bar has an opening therein aligned with the opening in the front end bar and through which the work shaft can extend so that the frame can also be mounted on a work shaft intermediate its ends.

3. A tool as called for in claim 2 wherein said carriage and the drive train to the output shaft is offset laterally to one side of said frame so that the cutter can be advanced to a position directly adjacent the front end bar without obstruction between the frame and carriage.

4. A tool as called for in claim 1 wherein the connection between the support bar and the rear end bar is adjustable vertically of the rear end bar so that the support bar can be inclined to the path of travel on the carriage to enable cutting a key seat on a tapered portion of a work shaft.

5. A tool as called for in claim 1 wherein said guide bar is of generally rectangular cross section and said slide comprises a block having a slot therein corresponding with the cross sectional shape of the guide bar and interfitting therewith.

* * * * *